March 21, 1961 J. KURTOVICH 2,975,647
MOTOR ASSEMBLY FOR A DRILL PRESS
Filed Oct. 3, 1958 2 Sheets-Sheet 2

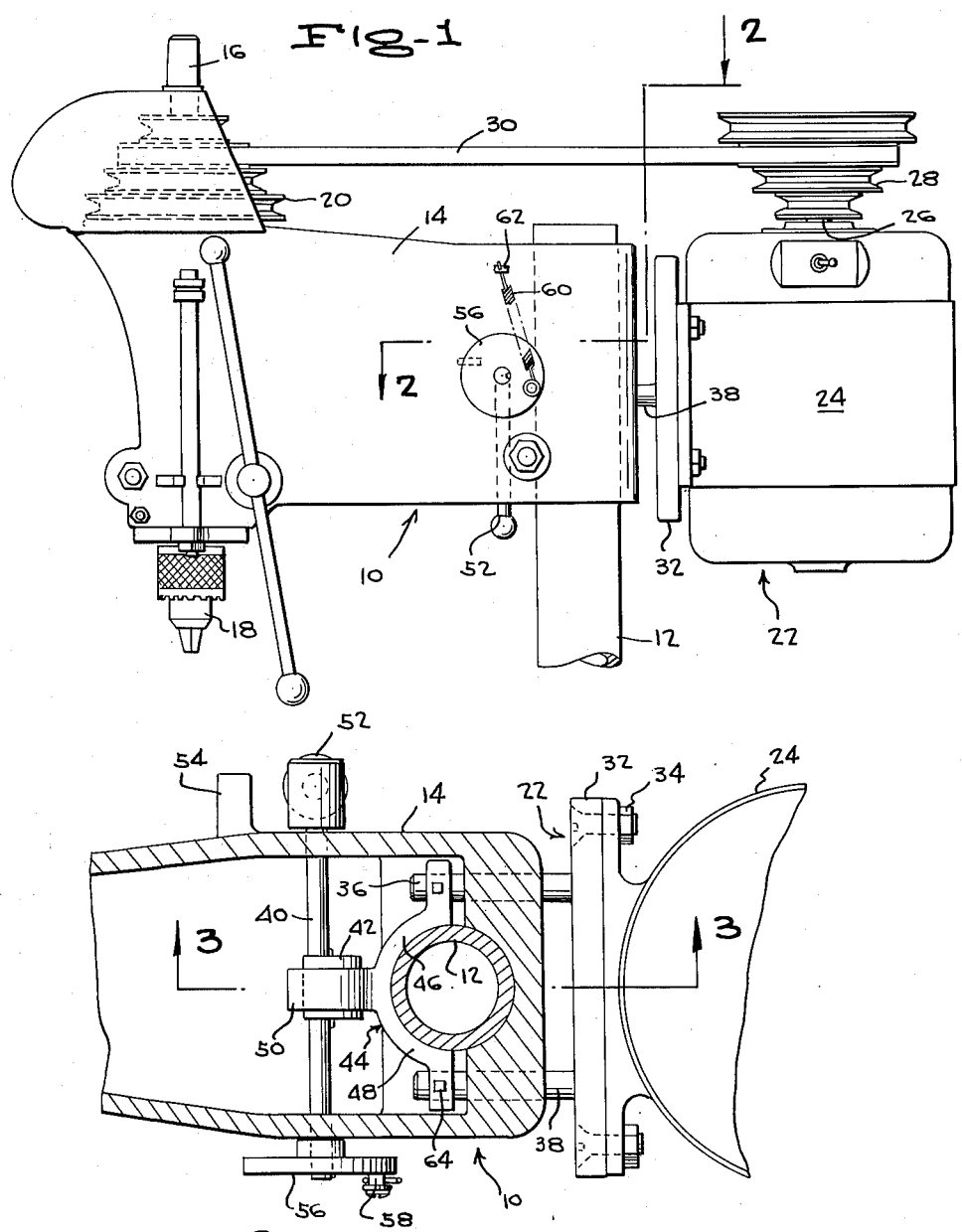

INVENTOR.
JOSEPH KURTOVICH
BY
McMorrow, Berman & Davidson
ATTORNEYS

2,975,647
MOTOR ASSEMBLY FOR A DRILL PRESS

Joseph Kurtovich, 318 S. 57th Ave. W., Duluth, Minn.

Filed Oct. 3, 1958, Ser. No. 765,162

2 Claims. (Cl. 74—242.16)

The present invention relates to a motor assembly for a drill press.

Drill presses presently in use have multiple step pulleys on the spindle or driven shaft and on the motor shaft or drive shaft. A belt is trained over a complemental pair of steps of the pulleys for driving the spindle or driven shaft. When it is desired to change the speed of rotation of the driven shaft, it is necessary to shift the belt to another pair of steps. Generally, this is accomplished by manually stretching the belt sufficiently to permit a portion of the belt to be offset and forced over the edge or rim of one pulley of the pair of pulleys and then by rotating the pulleys by hand, moving the offset portion around the pulley so that the following part of the belt falls in the groove of the next adjacent and smaller pulley, thus freeing the belt for removal from the pulleys. This stretching of the belt is generally accompanied by a twisting of the belt portion. A twisting and stretching of the belt reduces its wearing qualities and shortens its life.

An object of the present invention is to provide a motor assembly for a drill press which enables an operator of the drill press to shift the belt on the multiple step pulleys without stretching or twisting the belt, thus prolonging the life of usefulness of the belt.

Another object of the present invention is to provide a motor assembly for a drill press which enables the operator of the drill press to shift the belt on the multiple step pulleys of the drive and driven shafts with ease and facility and in a minimum interval of time.

A further object of the present invention is to provide a motor assembly for a drill press which is adaptable for use with any machine having a driven shaft and a motor drive shaft arranged in lateral alignment with respect to each other and in which it is desirable that the shafts be movable toward and away from each other.

A still further object of the present invention is to provide a motor assembly which is sturdy in construction, one simple in structure, one positive in action, and one which is economically feasible.

These and other objects and advantages of the present invention will be fully apparent from the following description when taken in conjunction with the annexed drawings, in which:

Figure 1 is an elevational view of the upper end portion or head of a drill press with a portion of the column of the drill press broken away and the base of the drill press omitted, with the motor mount of the present invention installed thereon;

Figure 2 is a view taken on the line 2—2 of Figure 1;

Figure 3:
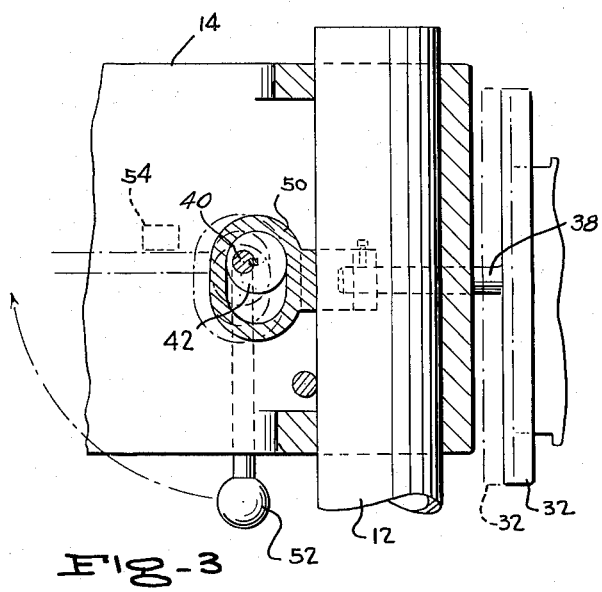
Figure 3 is a view taken on the line 3—3 of Figure 2, the arrow indicating the direction of swinging movement of the operating handle and the dotted lines indicating the shifted position of the motor support block as shifted by movement of the operating handle.

Referring to Figure 1, the reference numeral 10 designates generally a drill press of which only an upper portion is shown and which is of conventional construction. The drill press 10 includes a vertically disposed column 12 which rises from a base (not shown) and carries a head 14 on its upper end. The head 14 supports a vertically disposed rotatable spindle 16 constituting a driven shaft. The spindle 16 carries on its lower end a chuck 18 for holding a drill or other tool and carries on its upper end a multiple step pulley 20.

The motor assembly of the present invention is designated generally by the reference numeral 22 and includes a motor 24 having a shaft 26 constituting a drive shaft. The drive shaft 26 is positioned so that it is vertically disposed and in lateral alignment with respect to the spindle 16. The drive shaft 26 carries another multiple step pulley 28 and a belt 30 extends between and is trained over the pulleys 20, 28, on complemental steps or portions of the pulleys 20 and 28.

Means is provided connecting the motor assembly 22 to the head 14 for movement of the drive shaft 26 toward and away from the spindle 16.

Specifically, this means comprises a block member 32 fixedly secured to the motor assembly 22 and supporting the motor 24. Bolt and nut assemblies 34 secure the motor 24 on the face of the block member 32. A pair of spaced supporting bars 36 and 38 project perpendicularly from the face of the block member 32 remote from the motor 24 and are carried by the block member 32. The supporting bars 36 and 38 extend through holes provided in the adjacent end of the head 14 and are connected to the head 14 for sliding movement toward and away from the head 14.

Figure 6:
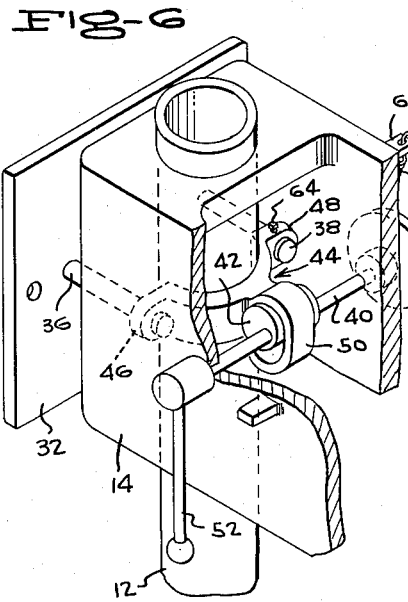
Figure 6 is an isometric view of the head of the drill press with portions broken away to reveal the eccentric components of the motor assembly of the present invention.

Means is operatively connected to the motor assembly 22 for effecting the movement of the motor assembly 22 towards and away from the spindle 16. Specifically, this means comprises a horizontally disposed rotatable shaft 40 having its end portions journaled in the head 14. The shaft 40 carries an eccentric 42 intermediate its ends, as shown most clearly in Figures 2, 3, and 6.

Means is provided connecting the eccentric 42 to the bars 36 and 38 so that sliding movement of the bars 36 and 38 is responsive to rotational movement of the eccentric 42 with the shaft 40. Specifically, this means includes a yoke 44 (Figures 2 and 6) having legs 46 and 48 and a vertically disposed oval channel 50 projecting from its midportion and encompassing the eccentric 42.

Figure 5:
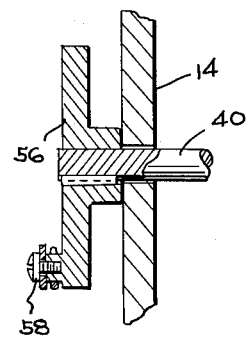
Figure 5 is a view taken on the line 5—5 of Figure 4.

Means is provided by the present invention operatively connected to the bars 36 and 38 for effecting the movement of the latter. This means consists in an actuating arm 52 (Figures 3 and 5) having one end fixedly secured to the projecting end portion of the shaft 40 exteriorly of the head 14 on one side of the latter. A stop 54 projects from the side of the head 14 adjacent the arm 52 and in the path of movement of the arm 52 for limiting the rotational movement of the shaft 40 to 90 degrees of rotation from the position shown in Figure 3 in which the arm 52 is vertical to the position shown in Figure 4 in which the arm is horizontal.

Movement of the arm 52 in the counterclockwise direction (Figure 3) beyond the vertical position is prevented by the engagement of the concave base of the yoke 44 on the adjacent portion of the column 12, as shown in Figure 2.

Figure 4:
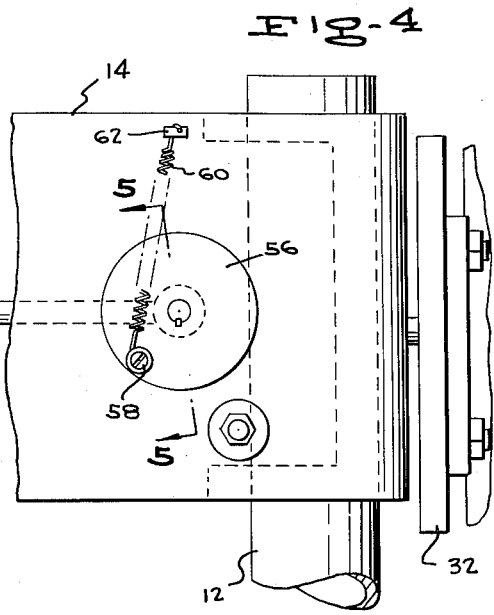
Figure 4 is a view similar to Figure 3, showing the motor support block in shifted position.

Means is provided for retaining the arm 52 in either the vertical position in Figure 3 in which the block member 32 is at the limit of its movement away from the head 14 or in the horizontal position in Figure 4 in which the block member 32 has been shifted to the position toward the head 14, as shown in Figure 4 in full lines and in dotted lines in Figure 3. This means includes a disc 56 fixedly secured to the portion of the shaft 40 projecting exteriorly of the head 14 on the side remote from the arm 52. A crank pin 58 projects from the exterior face of the disc 56 adjacent the periphery of the disc 56. A coil spring 60 under tension has one end secured to the crank pin 58 and the other end secured to a lug 62 which projects outwardly of the head 14 adjacent the upper end of the latter, as shown in Figure 4. The crank pin 58 and spring 60 provides an over center action to the arm 52 and holds the arm 52 in the horizontal position or the vertical position when shifted to such position.

Set screws 64 are threaded in bores provided in the free end portions of the legs 46 and 48 of the yoke 44 and have their one ends bearing against the adjacent portions of the bars 36 and 38. The set screws 64 form a means by which the bars 36 and 38 may be adjusted relative to the eccentric 42, thereby providing a means by which the belt 30 may be loosened or tightened between and on the laterally aligned pulleys 20 and 28.

In use, the arm 52 is normally in the vertical position (Figure 3) and the block member 32 is in the away position with respect to the spindle 16. This applies to the belt 30 the tension required to drivingly connect the motor drive shaft 26 to the driven shaft or spindle 16. When it is desired to change the belt 30 to other stub portions of the pulleys 20 and 28, the arm 52 is manually shifted to the horizontal position (Figure 4) thereby rotating the shaft 40 and eccentric 42 and effecting the shifting of the block member 32 to its position toward the spindle 16. The belt 30 may then be manually shifted upwardly or downwardly on the pulleys 20 and 28 with ease and facility and without the application of stretching forces or twisting forces to the belt 30. Upon the return of the arm 52 from the horizontal position to the vertical position, the motor drive shaft 26 will again be drivingly connected to the spindle 16, constituting the driven shaft.

What is claimed is:

1. The combination with a head having a vertically disposed driven shaft, of a motor assembly including a drive shaft positioned so that the drive shaft is vertically disposed and in lateral alignment with respect to the driven shaft, a block member fixedly secured to said motor assembly, supporting bars carried by said block member and connected to said head for sliding movement toward and away from said head, a horizontally disposed rotatable shaft having end portions journaled in and projecting from said head, and eccentric on the part of said rotatable shaft between said rotatable shaft projecting end portions, means connecting said eccentric to said bars so sliding movement of said bars is responsive to rotational movement of said eccentric, a vertically disposed arm having one end fixedly secured to one of the projecting end portions of said rotatable shaft and shiftable from the vertical position to a horizontal position to effect rotation of said shaft 90°, and means on the other projecting end portion of said rotatable shaft for retaining said arm in the vertical or horizontal positions, said last-named means embodying a disc on the other projecting end portion of said rotatable shaft, a crank pin on said disc, and spring means operatively connecting said crank pin to said head.

2. The combination with a head having a vertical disposed driven shaft, of a motor assembly including a drive shaft positioned so that the drive shaft is vertically disposed and in lateral alignment with respect to the driven shaft, a block member fixedly secured to said motor assembly, supporting bars carried by said block member and connected to said head for sliding movement toward and away from said head, a horizontally disposed rotatable shaft having end portions journaled in and projecting from said head, an eccentric on the part of said rotatable shaft between said rotatable shaft projecting end portions, means embodying a yoke secured to said bars and having an oval channel encompassing said eccentric to said bars so sliding movement of said bars is responsive to rotational movement of said eccentric, a vertically disposed arm having one end fixedly secured to one of the projecting end portions of said rotatable shaft and shiftable from the vertical position to a horizontal position to effect rotation of said rotatable shaft 90°, a stop projecting from said head and in the path of movement of said arm and engaging said arm when moved to said horizontal position, and means on the other projecting end portion of said rotatable shaft for retaining said arm in the vertical or horizontal positions, said last-named means embodying a disc on the other projecting end portion of said rotatable shaft, a crank pin on said disc, and spring means operatively connecting said crank pin to said head.

References Cited in the file of this patent

UNITED STATES PATENTS

| | | |
|---|---|---|
| 1,137,033 | Thomson | Apr. 27, 1915 |
| 2,027,111 | Manley | Jan. 7, 1936 |
| 2,211,050 | Boice | Aug. 13, 1940 |
| 2,450,080 | Burrell et al. | Sept. 28, 1948 |
| 2,618,163 | Russell | Nov. 18, 1952 |

FOREIGN PATENTS

| | | |
|---|---|---|
| 217,843 | Switzerland | June 16, 1942 |